E. W. HITCHCOCK.
EGG SHIPPING CRATE.
APPLICATION FILED MAR. 21, 1917.
1,266,805.
Patented May 21, 1918.
3 SHEETS—SHEET 2.
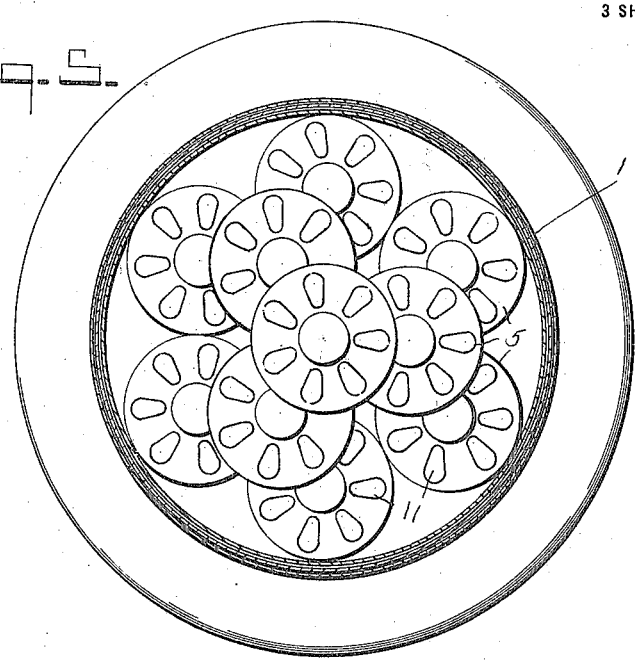
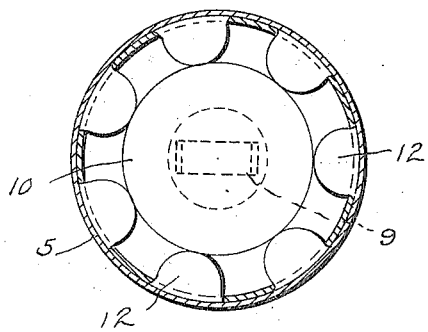
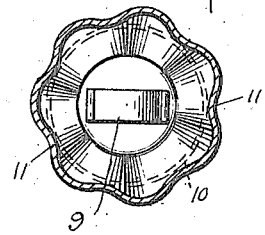
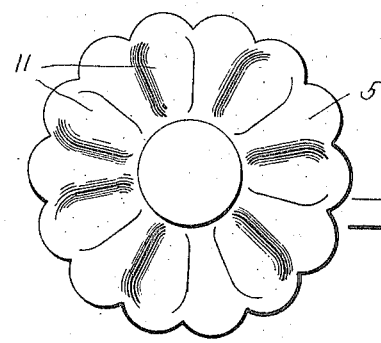
Inventor
E. W. Hitchcock
Witnesses E. W. HITCHCOCK.
EGG SHIPPING CRATE.
APPLICATION FILED MAR. 21, 1917.
1,266,805.
Patented May 21, 1918.
3 SHEETS—SHEET 3.
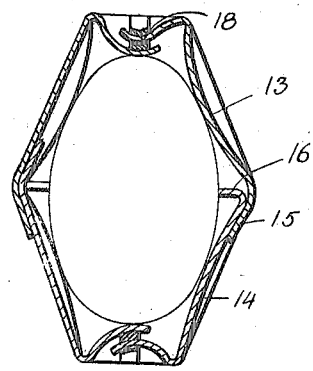
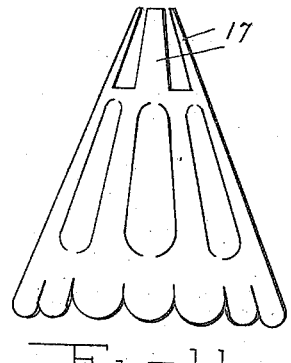
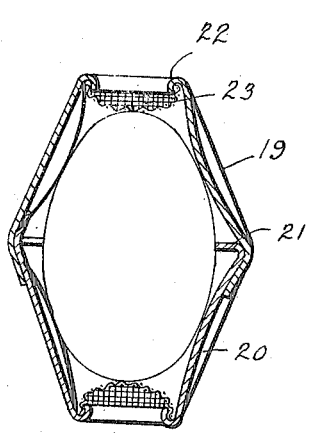
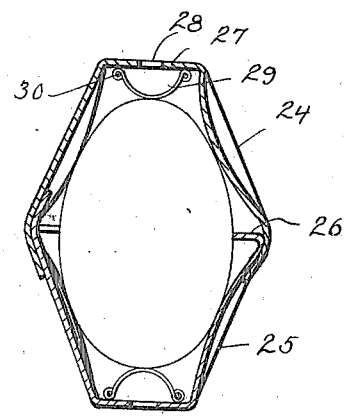
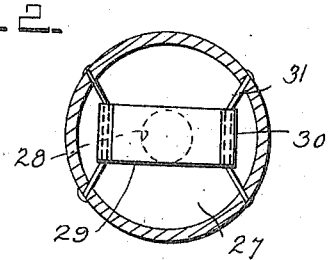
Inventor
E. W. Hitchcock
Witnesses

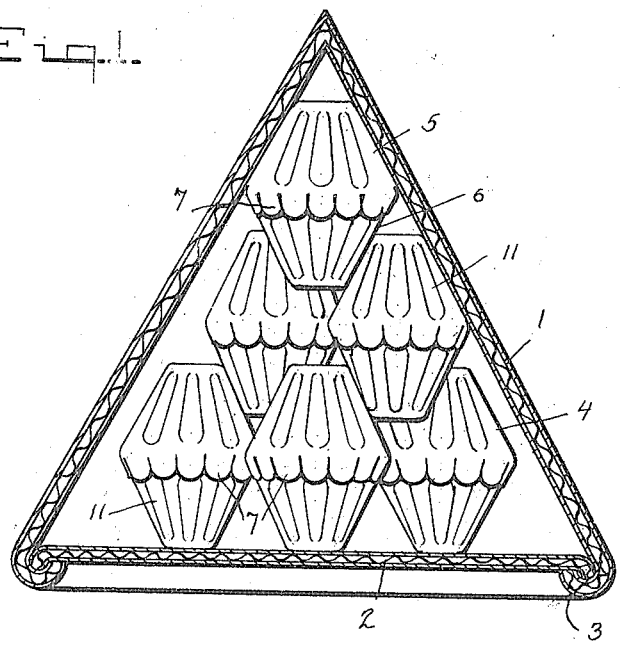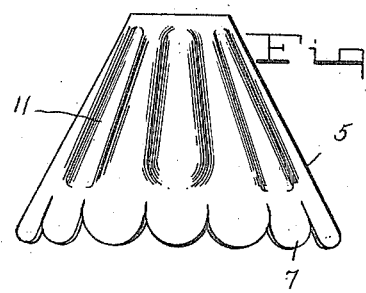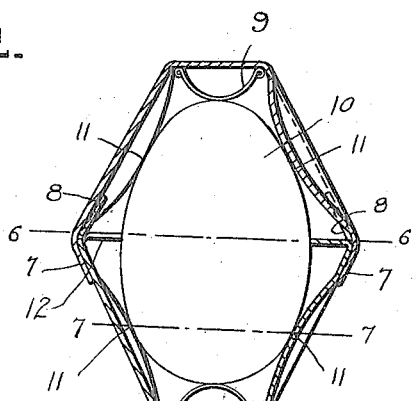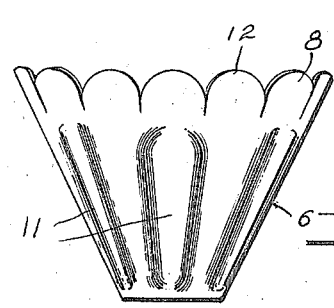

UNITED STATES PATENT OFFICE.

EDWARD W. HITCHCOCK, OF WALDEN, COLORADO.

EGG-SHIPPING CRATE.

1,266,805.  Specification of Letters Patent.  Patented May 21, 1918.

Application filed March 21, 1917. Serial No. 156,318.

*To all whom it may concern:*

Be it known that I, EDWARD W. HITCHCOCK, a citizen of the United States, residing at Walden, in the county of Jackson and State of Colorado, have invented certain new and useful Improvements in Egg-Shipping Crates; and I do hereby declare the following to be a full, clear, and exact description of the invention, such as will enable others skilled in the art to which it appertains to make and use the same.

This invention relates to egg shipping crates and has for one of its objects the provision of a device of this character whereby a great number of eggs may be conveniently packed in a casing or crate of a comparatively small size.

Another object of this invention is to provide a conical shaped crate adapted to receive a plurality of double conical shaped egg cells, each containing an egg, and which are so positioned in the crate as to prevent them from moving in relation to each other or the crate, thus obviating the danger of breaking the eggs.

A further object of this invention is to provide the double conical shaped eggs cells each of a pair of sections of frusto-conical shape, whereby the eggs may be readily placed in the egg cells by separating or detaching the sections from each other.

A further object of this invention is to provide the egg cells so constructed that the eggs will be supported at various points thereby.

A still further object of this invention is the provision of an egg shipping crate of the above stated character, which shall be simple, durable and efficient, and which may be manufactured and sold at a comparatively low cost.

With these and other objects in view as will become more apparent as the description proceeds, the invention consists of certain novel features of construction, combination and arrangement of parts as will be hereinafter more fully described and claimed.

For a complete understanding of my invention, reference will be had to the following description and accompanying drawings, in which:

Figure 1 is a vertical sectional view of an egg shipping crate constructed in accordance with my invention, Fig. 2 is an elevational view of the upper section of one of the eggs cells, Fig. 3 is a similar view of the lower section, Fig. 4 is a vertical sectional view of the egg cells illustrating an egg supported therein, Fig. 5 is a longitudinal sectional view illustrating the eggs cells arranged in the crate, Fig. 6 is a sectional view taken on the line 6—6 of Fig. 4, Fig. 7 is a sectional view taken on the line 7—7 of Fig. 4, Fig. 8 is a top plan view of one of the egg cells, Fig. 9 is a detail perspective view of a spring located in each end of the egg cells, Fig. 10 is a vertical sectional view of a modified form of egg cell, illustrating the means for forming air vents and resilient supporting means for the egg therein, Fig. 11 is a side elevation of one of the sections of the modified form of egg cell, Fig. 12 is a vertical sectional view illustrating another modified form of egg cell with a modified form of cushioning means in the ends thereof, Fig. 13 is a vertical sectional view of a modified form of means for securing the spring as illustrated in Fig. 9 to the egg cell, Fig. 14 is a transverse sectional view of the same.

Referring in detail to the drawings, the numeral 1 indicates a conical shaped crate or casing, the walls of which are constructed from corrugated paper or other suitable material and the bottom wall 2 thereof is held upon the walls of the bottom as shown at 3. A plurality of double conical shaped egg cells 4 are positioned within the conical shaped crate or casing 1 so that they interlock with each other to prevent relative movement with relation to each other and engage the inner surface of the side wall of the crate or casing 1 and in relation with the casing or crate 1. The egg cells 4 are each identical in construction and reference to one is thought to be sufficient for all.

The egg cells 4 consist of upper and lower sections 5 and 6, each of which is substantially frusto-conical in shape and constructed from corrugated material, such as paper or the like. The upper and lower sections 5 and 6, each have a plurality of fingers 7 and 8 formed upon the edges thereof. The fingers 7 of the upper section 5 are adapted to engage and receive the wall of the lower section 6 for holding the sections together. Secured to the apex and upon the interior of the same of each of the upper and lower sections is an arcuate shaped spring 9. The springs 9 are adapted to engage each end of the egg 10 as clearly shown in Fig. 4. The walls of the sections 5 and 6 being constructed of corrugated material engage the sides of the egg as shown at 11.

Before assembling or connecting the upper and lower sections together and after the egg has been placed in the lower section, every other one of the fingers 8 are bent inwardly as shown at 12 to engage the egg 10 at points intermediate its end, while the other fingers 8 extend upwardly and engage the interior wall of the section 5 when said sections are applied together coöperating with the fingers 7 in securing the sections together. It will be seen that the egg 10 is held from movement with relation to the wall of the sections 5 and 6 and also is provided with a cushion engaging point to the sections, which sections will absorb any shock or jar to the egg, thus preventing it from becoming broken.

Referring to my modified form of egg cell as disclosed in Figs. 10 and 11, it consists of upper and lower sections 13 and 14, each of which is substantially frusto-conical in shape and constructed from prepared cheese cloth, paper, cardboard and the like. The upper and lower sections 13 and 14, each have a plurality of fingers 15 and 16, formed upon the edge thereof. The fingers 15 of the upper section 13 are adapted to engage and receive the wall of the lower section 14 for holding the sections together. The fingers 16 formed upon the lower section 14 some of which are bent at right angles and engage an egg as shown in Fig. 1, while the others engage the inner face of the upper section. The apexes of the upper and lower sections are each provided with a plurality of cutaway portions to form fingers 17, which are adapted to be crimped inwardly and overlap alternately as shown at 18 in Fig. 10 to form a cushioning support for the ends of the egg shown in Fig. 10 and also providing vent openings for admitting ventilation to the eggs.

Referring to my modified form of invention as disclosed in Fig. 12, it consists of the usual upper and lower sections 19 and 20, which are connected together in the usual manner by the fingers 21, and which fingers aid in supporting the eggs within the sections. The apexes of the upper and lower sections 19 and 20 are crimped inwardly as shown at 22 and received in the crimped portions thereof are oval shape springs 23 for engagement with the ends of the eggs. The springs 23 are constructed from wire mesh and permit air to circulate through the sections 19 and 20 for ventilating the eggs therein.

Referring to my modified form of invention disclosed in Figs. 13 and 14, it consists of the upper and lower sections 24 and 25, which are connected together by the usual fingers 26, and have their apexes closed by walls 27, which are provided with vent openings 28 for admitting air to the interior of the sections for ventilating the eggs therein. Arcuate shaped springs 29 similar to the spring 9 of Fig. 9 have their ends rolled to form eyelets 30, which receive wires 31, the wires 31 have their ends extending through the walls of the sections and bent over to secure the springs 29 within the ends of the sections, thus forming a cushion for each end of the egg, which will not become detached from the sections when parted.

While I have shown and described the preferred embodiment of my invention, it will be understood that minor changes in construction, combination and arrangement of parts may be made without departing from the spirit and scope of the invention as claimed.

What is claimed is:

1. A device of the character set forth comprising a conical shaped crate, and a plurality of double conical shaped egg cells arranged within the crate.

2. A device of the character set forth comprising a conical shaped crate, a removable bottom secured to said crate, and a plurality of double conical shaped egg cells arranged within the crate and interlocked with each other to prevent them from relative movement with relation to each other and with relation to the crate.

3. An egg cell comprising upper and lower substantially frusto-conical shaped sections constructed from corrugated material, springs secured to the apexes of the sections for supporting each end of an egg, means for connecting the sections together, and means carried by the lower section for engaging an egg at points intermediate its ends.

4. An egg cell comprising upper and lower substantially frusto-conical shaped sections constructed from corrugated material, springs secured to the apexes of the sections for supporting each end of an egg, fingers formed upon each section, the fingers of the upper section being adapted to engage the wall of the lower section, and some of the fingers upon the lower section adapted to engage the inner wall of the upper section, which fingers coöperate with the fingers upon the upper section in connecting the sections together.

5. An egg cell comprising upper and lower substantially frusto-conical shaped sections constructed from corrugated material, springs secured to the apexes of the sections for supporting the ends of an egg, fingers formed upon the upper and lower sections, the fingers of the upper section adapted to engage the wall of the lower section, some of the fingers of the lower section adapted to be bent inwardly to engage the sides of the egg, and the other fingers of the lower section extending upwardly and engaging the inner wall of the upper section for coöperating with the fingers of the upper section when connecting the sections together.

6. An egg cell comprising upper and lower conical shaped sections, means for connecting the sections together, end walls closing the apexes of the sections, and having apertures therein, arcuate shaped springs located within the conical shaped sections and having their ends bent to form loops, and wires disposed through the loops and walls of the sections for supporting the springs in the sections.

In testimony whereof I affix my signature in presence of two witnesses.

EDWARD W. HITCHCOCK.

Witnesses:
LEMUEL E. McINDOO,
CHARLES H. REED.

Copies of this patent may be obtained for five cents each, by addressing the "Commissioner of Patents, Washington, D. C."